Feb. 3, 1942. E. P. BROWN 2,272,109
BASKET MAKING APPARATUS
Filed April 4, 1941 3 Sheets-Sheet 1
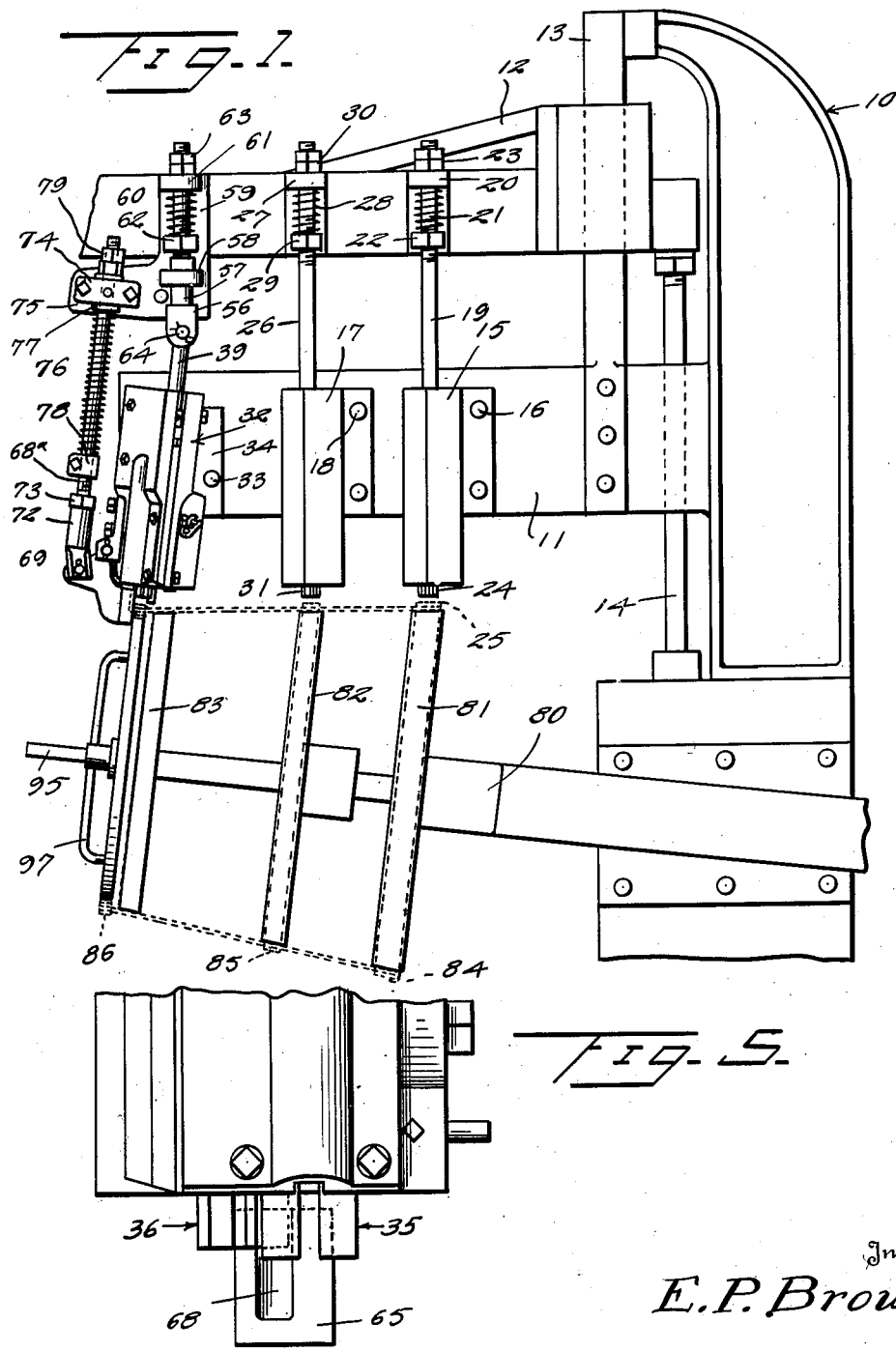
Inventor
E. P. Brown
By Kimmel & Crowell
Attorneys Feb. 3, 1942. E. P. BROWN 2,272,109
BASKET MAKING APPARATUS
Filed April 4, 1941 3 Sheets-Sheet 2
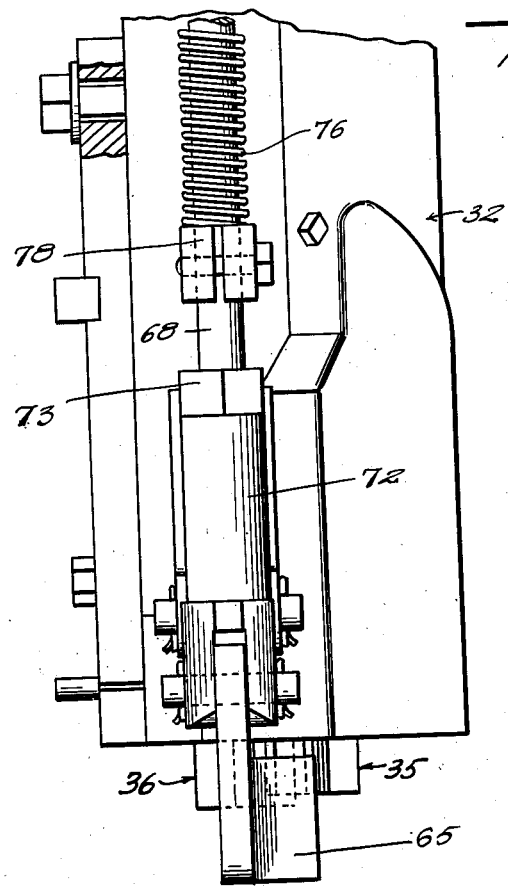
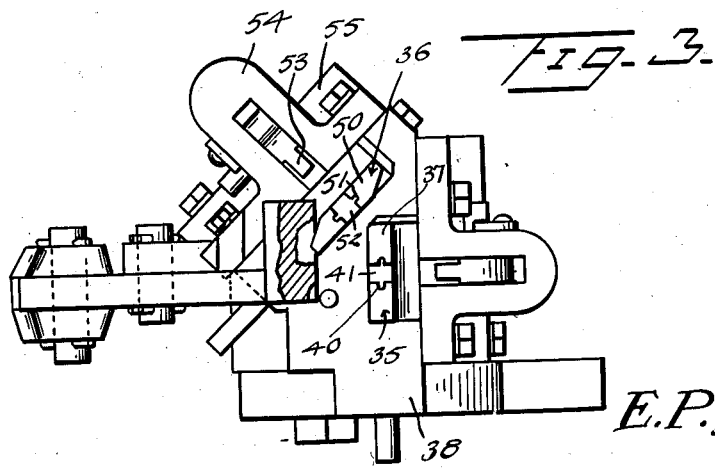
Inventor
E. P. Brown
By Kimmel & Crowell
Attorneys Feb. 3, 1942.　　　　E. P. BROWN　　　　2,272,109
BASKET MAKING APPARATUS
Filed April 4, 1941　　　3 Sheets-Sheet 3
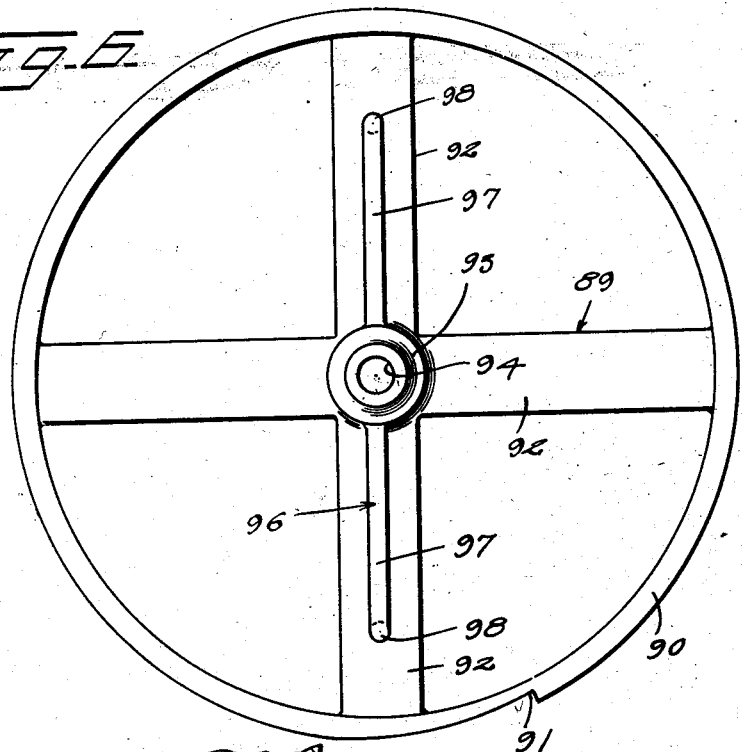
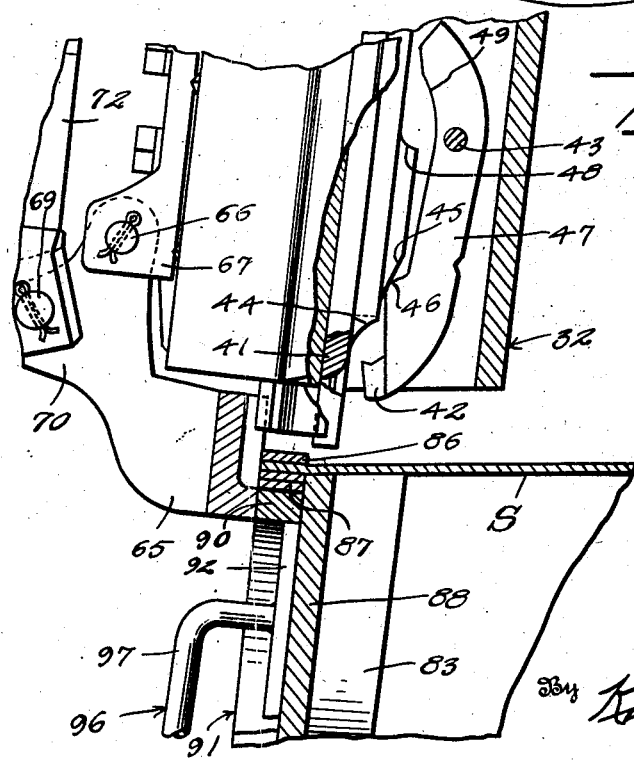
Inventor
E. P. Brown
By Kimmel & Crowell
Attorneys Patented Feb. 3, 1942

2,272,109

UNITED STATES PATENT OFFICE 2,272,109

BASKET MAKING APPARATUS

Edwin P. Brown, Murfreesboro, N. C., assignor to Riverside Manufacturing Co. Inc., Murfreesboro, N. C.

Application April 4, 1941, Serial No. 386,901

3 Claims. (Cl. 1—13.6)

This invention relates to basket making machines and more particularly to an improved means of securing the basket bottom and the lower hoops onto the staves of the basket.

An object of this invention is to provide an improved stapling head for a basket making machine which is so constructed that the basket bottom may be secured within the staves at the same time that the lower hoops are secured to the staves.

A further object of this invention is to provide in a basket making machine of this type, an improved anvil or staple clinching member which is adapted to removably engage on the spindle of the basket forming member so that the basket bottom may be secured to the staves by staples independent of the staples which secure the lower hoops to the staves below the bottom.

A further object of this invention is to provide in a basket stapling machine, an improved stapling head provided with a pair of staple drivers and formers which are disposed at an angle with respect to each other so that the two lower staples will not split the stave and will firmly hold the basket on the seat formed by the innermost hoop which is positioned below the bottom.

A further object of this invention is to provide a machine of this character, a pair of staple guiding and presser members which in their operative position are adapted to be offset one with respect to the other so that one of the staple guiding and pressing members may engage the stave of the basket upwardly from the lower outermost hoop and provide a means for firmly holding the stave against the periphery of the bottom wall during the driving of the staple through the stave into the bottom.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention, as claimed.

In the drawings:

Figure 1 is a fragmentary detail side elevation of a basket making machine embodying my invention.

Figure 2 is an enlarged fragmentary front elevation of the foremost stapling head which secures the bottom within the staves and also secures the lowermost hoops to the staves below the bottom.

Figure 3 is a bottom plan partly broken away and in section of the stapling head shown in Figure 2.

Figure 4 is an enlarged fragmentary sectional view partly in detail of the foremost stapling head showing the head in operative position for securing the bottom to the basket.

Figure 5 is a fragmentary rear elevation of the lower portion of the foremost stapling head.

Figure 6 is a front elevation of the anvil or staple clinching member removed from the machine.

Referring to the drawings, the numeral 10 designates generally a frame structure which has fixed thereto a horizontally disposed supporting arm 11. A slide member 12 is vertically slidable on a guide means 13, which extends vertically upwardly from the arm 11 and the slide 12 is vertically moved by means of a vertically movable operating shaft or rod 14 which is connected to a suitable rod reciprocating mechanism (not shown) but which may be similar to the operating mechanism shown in Patent No. 1,682,769. An upper stapling head 15 is fixed by fastening devices 16 to the arm 11 and is adapted to secure the staples to the uppermost hoop of the basket. A second or intermediate stapling head 17 is secured by fastening devices 18 to the arm 11, forwardly from the stapling head 15 and is adapted to secure staples in the intermediate hoop which engages about the exterior of the basket.

The stapling head 15 is provided with a vertically movable shaft 19 which extends through an outstanding ear 20 carried by the slide 12. A spring 21 engages about the operating member 19 and at its lower end bears against a spring tensioning nut 22 and at its upper end bears against the ear 20. A nut 23 is threaded onto the operating member 19 above the ear 20. The operating member 19 is adapted to vertically move the staple guiding member 24 carried by the head 15 downwardly into contact with the uppermost hoop 25 and at the same time that the staple guiding member 24 is being moved downwardly, the staple driver and former forming part of the stapling head 15 will be moved to an active position. The construction of the stapling head 15 is conventional, being somewhat along the lines of construction of the stapling head shown in Patent No. 1,999,821. A driver operating rod 26 extends upwardly from the stapling head 17 and is slidable through an ear 27 carried by the slide member 12.

A spring 28 engages about the rod or operating member 26 and at its lower end bears against a spring tensioning nut 29, which is threaded onto the rod or operating member 26 and the upper end of the spring 28 bears against the outstanding ear 27. A nut 30 is threaded onto the rod or operating member 26 above the ear 27 so as to thereby limit the downward movement of the rod or operating member 26. A staple guiding and forming structure 31 extends downwardly from the head 17, being operatively connected with the operating member 26 so that vertical reciprocation of the operating member 26 will effect vertical movement of the staple forming and guiding member 31.

A forward stapling head generally designated as 32 is secured by fastening devices 33, which engage through a plate 34 to the arm 11 at the forward end of the arm 11. The stapling head 32 is a multiple head, being provided as shown in Figure 3, with a bottom stapling means 35 and a lower hoop stapling means 36. The stapling means 35 and 36 each include a pair of vertically grooved staple guiding members 37, which are slidable in a body 38 and which are connected at their upper ends to an operating member 39.

The two complementary guiding members 37 are provided in their confronting faces with staple guiding grooves 40 and a staple driver 41 is slidable between the two guiding members 37. The guiding members 37 also constitute staple formers which during the initial downward movement of the operating member 39 are adapted to cut a straight piece of wire and then bend this cut wire in U-shape over a swingable staple former 42, which is swingably mounted on a pivot 43. The driver 41 is provided on one side thereof and upwardly from the lower end with a pair of cam faces 44 and 45, which are adapted to engage a cam element 46 which is formed on the inner side of the lever 47 carrying the staple forming member 42.

The cam faces 44 and 45 are adapted to swing the staple forming member 42 outwardly to an inactive position upon downward movement of the driver 41. The driver 41 is also provided with another cam surface 48, which is adapted to engage an inwardly offset cam member 49, which is formed on the lever 47 above the pivot 43 so that when the driver 41 moves upwardly, the cam surface 48 will strike the cam member 49 and thereby swing the stapling head 44 inwardly to an operative position between the two staple guiding and forming members 37 with the forming member 42 positioned below the driver 41.

The stapling members 36 include a pair of combined staple guiding and forming members 50, which are disposed with their confronting faces in spaced apart relation, and the staple forming and guiding members 50 are provided with confronting staple guiding grooves. The guiding and forming members 50 are disposed at an acute angle to the driving and forming members 37, and as shown in Figure 3, the forming members 50 are adapted when in operative position for guiding the staple to be disposed in laterally offset and angular relation with respect to the lower ends of the two guiding and forming members 37. The staple driving means 35 is positioned relatively lower than the staple driving means 36. In Figure 3 of the drawings the hoop (not shown) is disposed vertically across the stapling heads.

The staple which is guided by the grooves 51 is driven into the hoops of the basket by means of a driver 52, which is slidable between the two forming members 50. A staple forming member 53 is rockably mounted in a housing 54 carried by the body 55 forming part of the stapling head 32, and the staple forming member 53 is constructed similar in every detail to the staple forming member 42.

The operating member 39 is connected at its upper end to a fork or U-shaped member 56, which is carried by the lower end of a vertically reciprocating rod 57. The rod 57 is slidable through an ear 58 carried by a plate 59, which is fixed to the slide member 12 and a spring 60 is disposed loosely about the rod 57 and at its upper end bears against an ear 61 carried by the upper portion of the plate 59.

A spring tensioning nut 62 is threaded onto the rod 57 and bears against the lower end of the spring 60. An upper nut 63 is threaded onto the rod 57 and is adapted to limit the downwardly sliding movement of the rod 57. The fork 56 is connected by means of a pin 64 to the upper end of the operating member 39 and as shown in Figure 1, the operating member 39 is disposed at an obtuse angle to the length of the rod 57. An anvil presser foot 65 is pivotally mounted on a pivot 66 extending between a pair of ears 67, which are carried by the stapling head 32. The presser foot 65 is formed with a recess or cutout 68 extending downwardly from the upper end thereof within which an edge of one of the staple forming and guiding members 50 is adapted to engage as shown in Figure 3 when the staple head 32 is moved to an operative position.

The presser member 65 is rocked in a direction toward the former members 50 by means of an elongated operating rod 68ª, which is secured as at 69 to a lug 70 carried by the presser member 65. The foot operating member 68 is threaded into a sleeve 72 and locked in adjusted position relative to the sleeve 72 by means of a locking nut 73. In this manner the length of the foot operating member 68 may be lengthened or shortened.

The foot operating member or rod 68 is slidable through a bearing or guide 74, which is carried by an arm 75 formed integral with the plate 59. A spring 76 is disposed loosely about the operating member 68 and one end of the spring 76 bears against a washer 77 which is disposed in contacting relation with the lower side of the bearing or guide 74 and the opposite end of the spring 76 engages against a split collar 78, which is adapted to be clamped in adjusted position along the length of the rod 68ª so as to place the spring 76.

The upper end of the rod 68 has a pair of lock nuts 79 threaded thereon which if desired may be used for tensioning the spring 76 or for adjusting the position of the presser foot 65. A rotatable basket supporting shaft 80 is carried by the frame 10 below the stapling heads and is disposed at an upward and forward inclination as shown in Figure 1. The shaft 80 has mounted thereon an upper disc-like plate 81, an intermediate disc-like plate 82 and an outer disc-like plate 83. The staves S which form the sides of the basket are adapted to be mounted on the peripheral edges of the discs 81, 82 and 83 and preformed outer hoops 84, 85 and 86 are adapted to be disposed about the staves S in alignment with the discs 81, 82 and 83, respectively.

An inner laminated hoop 87 is adapted to be positioned interiorly of the lower ends of the staves S and a bottom wall 88 comprising the basket bottom is adapted to be engaged against the disc 83 and is adapted to be positioned inwardly from the double hoop 87. An annular anvil generally designated as 89 is adapted to be positioned within the circle described by the lower inner hoop 87 as shown in Figure 4. The anvil 89 comprises a circular anvil body 90 which is provided with a cutout 91 within which the overlapping ends of the hoop 87 are adapted to engage.

The annular member 90 has secured thereto a spider 92 having a hub 93 formed thereon which is provided with a central bore 94 for receiving the spindle 95 formed integral with the shaft 80. A handle or bale 96 is secured to the hub 93 and a pair of diametrically opposed arms of the spider 92. The handle 96 comprises an elongated bar 97, which is disposed in parallel relation with the outer face of a spider arm and the outer end of the bar 97 has formed integral therewith an L-shaped extension 98, which may be welded or otherwise fixedly secured to a spider arm. There are two of these bars 97 disposed one on opposite sides of the hub 92.

In the use and operation of this machine, the staves are mounted on the discs 81, 82 and 83 and the outer hoops 84, 85 and 86 are then disposed about the outer faces of the staves S in a position overlying the discs 81, 82 and 83. The bottom wall 88 which comprises the bottom of the basket is then disposed against the outermost disc 83, the bottom 88 being formed with a central opening for loosely receiving the spindle 95. The inner lower hoop 87 may be positioned about the annular anvil or staple clinching member 89 and then the anvil 89 may be slipped onto the spindle 95 with the multiple hoop 87 engaging interiorly of the staves S and in alignment with the hoop 86.

The slide member 12 may then be shifted downwardly so as to effect operation of the stapling heads 15, 17 and 32. The bottom 88 will be firmly secured to the inner faces of the staves S by the staples from the staple guiding members 37 driven by the driving member 41. When the guiding and forming members 37 are in operated position, the lower faces thereof will be disposed below the outer surface of the lower hoop 86 and the upper edge of the lower hoop 86, as shown in Figure 4, will be in substantial contact with the guiding and forming members 37. The guiding and forming members 50 will normally be disposed in laterally offset relation to the guiding and forming members 37 as shown in Figure 3 as the staples which are driven through the hoop 86, the staves S and into the hoop 87 by the driver 52 will be clinched by the peripheral surface of the anvil member 90.

With a construction of this kind, the bottom 88 is stapled to the stave S at the same time that the several hoops are stapled to the staves so that it is not necessary to initially staple the several hoops to the staves and subsequently remove the assembled staves with the hoops engaging thereabout and insert the bottom for stapling by a subsequent operation.

With a construction as herein disclosed, the bottom may be secured by the one operation of the stapling slide or head and by providing a multiple bottom stapling head one staple may be driven only through the staves and into the bottom whereas a second angularly disposed staple may be driven through the lowered inner and outer hoops.

What I claim is:

1. In an apparatus for making baskets, an anvil structure for clinching the staples employed for connecting the outer hoop, the internal hoop and the body of a basket together, said structure comprising an axially apertured circular body having a cutout in its outer edge to form a clearance for the overlapping ends of the internal hoop, a spider secured centrally of the outer face of and having a bore registering with the aperture of said body, and an outwardly directed bale secured to said hub and diametrically opposed arms of the spider.

2. In a basket making machine, including a plurality of stapling heads and a rotary basket support beneath said heads, a spindle carried by said support, an annular anvil removably engaging said spindle, and a bale carried by said anvils.

3. In a basket making machine, including a rotary basket support, and means for stapling the hoops and bottom to the staves in a single operation; an annular anvil engageable within said staves outwardly of the bottom, a spider carried by said anvil, a hub carried by said spider loosely engaging said support, and a bale carried by said spider.

EDWIN P. BROWN.